US012602613B2

(12) United States Patent
Guha Thakurta et al.

(10) Patent No.: US 12,602,613 B2

(45) Date of Patent: Apr. 14, 2026

(54) PRIVACY-ENHANCED TRAINING AND DEPLOYMENT OF MACHINE LEARNING MODELS USING CLIENT-SIDE AND SERVER-SIDE DATA

(71) Applicant: GOOGLE LLC, Mountain View, CA (US)

(72) Inventors: Abhradeep Guha Thakurta, Los Gatos, CA (US); Li Zhang, Saratoga, CA (US); Prateek Jain, Bangalore (IN); Shuang Song, Cupertino, CA (US); Steffen Rendle, Mountain View, CA (US); Steve Shaw-Tang Chien, San Carlos, CA (US); Walid Krichene, Fremont, CA (US); Yarong Mu, Kirkland, WA (US)

(73) Assignee: Google LLC, Mountain View, CA (US)

( * ) Notice: Subject to any disclaimer, the term of this patent is extended or adjusted under 35 U.S.C. 154(b) by 691 days.

(21) Appl. No.: 17/928,372

(22) PCT Filed: Apr. 5, 2022

(86) PCT No.: PCT/US2022/023438

§ 371 (c)(1),
(2) Date: Nov. 29, 2022

(87) PCT Pub. No.: WO2023/158446

PCT Pub. Date: Aug. 24, 2023

(65) Prior Publication Data

US 2024/0054391 A1 Feb. 15, 2024

(30) Foreign Application Priority Data

Feb. 18, 2022 (IN) .............................. 202221008565

(51) Int. Cl.
*G06N 20/00* (2019.01)
*G06F 21/62* (2013.01)

(52) U.S. Cl.
CPC ......... *G06N 20/00* (2019.01); *G06F 21/6218* (2013.01)

(58) Field of Classification Search
CPC .. G06F 21/6218; G06N 20/00; G06N 3/0455; G06N 3/063; G06N 3/09; G06N 3/098
See application file for complete search history.

(56) References Cited

U.S. PATENT DOCUMENTS

| | | | |
|---|---|---|---|
| 2018/0359078 A1 | 12/2018 | Jain et al. | |
| 2019/0253431 A1 | 8/2019 | Atanda | |

FOREIGN PATENT DOCUMENTS

| | | | | |
|---|---|---|---|---|
| CN | 114117203 | 3/2022 | | |
| WO | WO 2021080577 | 4/2021 | | |
| WO | WO-2021080577 A1 * | 4/2021 | ............. | G06N 20/20 |

OTHER PUBLICATIONS

Perifanis et al., "Federated Neural Collaborative Filtering", Feb. 16, 2022, arXiv:2106.04405v2, pp. 1-19. (Year: 2022).*

(Continued)

*Primary Examiner* — Brent Johnston Hoover

(74) *Attorney, Agent, or Firm* — Fish & Richardson P.C.

(57) ABSTRACT

Computer-implemented systems and methods for training a decentralized model for making a personalized recommendation. In one aspect, the method comprising: obtaining, using user activity data, client-side training data that includes features and training labels; and training, by the client device, a decentralized model in training rounds, wherein training, in each training round comprises: receiving, first data including a current server-side embedding generated by the server-side machine learning model, wherein the first data received from the server does not include any server-side data used in generating the current (Continued)

600 — receiving, from a client device, a request for a digital component to be provided for display within a content page displayed on the client device 510 receiving, from a client device, first data including a client-side embedding generated by a trained client-side machine learning model, wherein the trained client-side machine learning model and a server-side machine learning model jointly define a decentralized model trained to output data indicating where one or more digital components should be provided to a client device based on input user data and digital component attribute data 520 generating, using the server-side machine learning model and based on digital component attribute data relating to a plurality of digital components, a server-side embedding, wherein the digital component attribute data is stored at the server 530 combining the server-side embedding and the client-side embedding to obtain a combined embedding 540 generating, using the combined embedding and for each digital component in the digital components, a score indicating whether the digital component should be provided to the client device 550

Selecting, from among the plurality of digital components and based on the scores for the plurality components, a digital components 560 transmitting, to the client device, the selected digital component for provision within the content page displayed on the client device 570 server-side embedding; generating, using the client-side machine learning model, a client-side embedding based on the client-side training data; updating, using the client-side embedding and the current server-side embedding and based on the training labels, the client-side machine learning model; generating, an updated client-side embedding; and transmitting second data including the updated client-side embedding for subsequent updating of the server-side machine learning model.

25 Claims, 8 Drawing Sheets

(56)                     References Cited

OTHER PUBLICATIONS

Ji et al., "Learning Private Neural Language Modeling with Attentive Aggregation", Mar. 13, 2019, arXiv:1812.07108v2, pp. 1-8. ( Year: 2019).*

Ai.googleblog.com [online], "Federated Learning: Collaborative Machine Learning without Centralized Training Data" Apr. 2017, retrieved on Dec. 12, 2022, retrieved from URL <https://ai.googleblog.com/2017/04/federated-learning-collaborative.html>, 5 pages.

Bietti et al., "Personalization Improves Privacy-Accuracy Tradeoffs in Federated Optimization" submitted on Feb. 10, 2022, arXiv: 2202.05318V1, 22 pages.

Facebook.com [online], "Privacy-Enhancing Technologies and Building for the Future" Aug. 11, 2021, retrieved on Dec. 12, 2022, retrieved from URL <https://www.facebook.com/business/news/building-for-the-future>, 9 pages.

Github.com [online], "fbpcf" Jan. 2021, retrieved on Dec. 12, 2022, retrieved from URL <https://github.com/facebookresearch/fbpcf>, 11 pages.

Github.com [online], "Privacy" created on Dec. 2, 2018, retrieved on Dec. 12, 2022, retrieved from URL <https://github.com/tensorflow/privacy>, 5 pages.

International Search Report and Written Opinion in International Appln. No. PCT/US2022/023438, dated Nov. 15, 2022, 24 pages.

Jiang et al., "FedNCF: Federated Neural Collaborative Filtering for Privacy-preserving Recommender System" 2022 International Joint Conference on Neural Networks, IEEE, Jul. 18, 2022, 8 pages.

Perifanis et al., "Federated neural collaborative filtering" submitted on Feb. 16, 2022, arXiv: 2106.04405V2, 19 pages.

Privacytech.fb.com [online], "The Value of On-Device Learning" Aug. 2021, retrieved on Dec. 12, 2022, retrieved from URL <https://privacytech.fb.com/on-device-learning/>, 20 pages.

Qin et al., "Split Two-tower Model for Efficient and Privacy-Preserving Cross-device Federated Recommendation" submitted on Jun. 28, 2022, arXiv 2206.13715V1, 10 pages.

Silva et al., "FedEmbed: Personalized Private Federated Learning" submitted on Feb. 18, 2022, arXiv: 2202.09472V1, 15 pages.

Thepullrequest.com [online], "The Future of (ads) Privacy" Jul. 6, 2021, retrieved on Dec. 12, 2022, retrieved from URL <https://www.thepullrequest.com/p/the-future-of-ads-privacy>, 12 pages.

Theverge.com [online], "Facebook is rebuilding its ads to know a lot less about you" Apr. 11, 2021, retrieved on Dec. 12, 2022, retrieved from URL <https://www.theverge.com/2021/8/11/22619639/facebook-plans-privacy-focused-advertising-revamp>, 14 pages.

International Preliminary Report on Patentability in International Appln. No. PCT/US2022/023438, mailed on Aug. 29, 2024, 17 pages.

Office Action in Indian Appln. No. 202221008565, mailed on Mar. 4, 2025, 7 pages (with English translation).

Office Action in European Appln. No. 22720126.6, mailed on May 22, 2025, 13 pages.

Yang et al., "H-FL: A Hierarchical Communication-Efficient and Privacy-Protected Architecture for Federated Learning" CoRR, Submitted on Jun. 2021, arXiv:2106.00275v1, 7 pages.

* cited by examiner

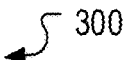
300 obtaining, by a client device and using user activity data stored at the client device, client-side training data that includes a plurality of features and a corresponding plurality of training labels          310 training, by the client device, a decentralized model in a plurality of training rounds, wherein the decentralized model is (1) trained to output data indicating whether one or more digital components should be provided to a client device based on input user activity data and digital component attribute data, and (2) includes a client-side machine learning model and a server-side machine learning model          320 perform one or more operations in each round of the plurality of training rounds          330 receiving, from a server, first data including a current server-side embedding generated by the server-side machine learning model, wherein the first data received from the server does not include any server-side data used in generating the current server-side embedding          340 updating, using the client-side embedding and the current server-side embedding and based on the plurality of training labels, the client-side machine learning model          360 generating, using the updated client-side machine learning model, an updated client-side embedding          370 transmitting, by the client device and to the server, second data including the updated client-side embedding for subsequent updating of the server-side machine learning model          380

FIG. 3

400 obtaining, by a server and using server-side data obtained from a server-side user, server-side training data that includes a plurality of features and a corresponding plurality of training labels    410 training, by the server, at least part of a decentralized model in a plurality of training rounds, wherein the decentralized model is (1) trained to output data indicating whether one or more digital components should be provided to a client device based on input user activity data and digital component attribute data, and (2) includes a client-side machine learning model and a server-side machine learning model    420 perform, by the server, one or more operations in each round of the plurality of training rounds    430

FIG. 4A

430 receiving, from a client device, second data including a current client-side embedding generated by the client-side machine learning model, wherein the second data received from the client device does not include any client-side data used in generating the current client-side embedding    440 updating, using the server-side embedding and the current client-side embedding and based on the plurality of training labels, the server-side machine learning model    460 generating, using the updated server-side machine learning model, an updated server-side embedding    470 transmitting, by the server and to the client device, first data including the updated server -side embedding for subsequent updating of the client-side machine learning model   480

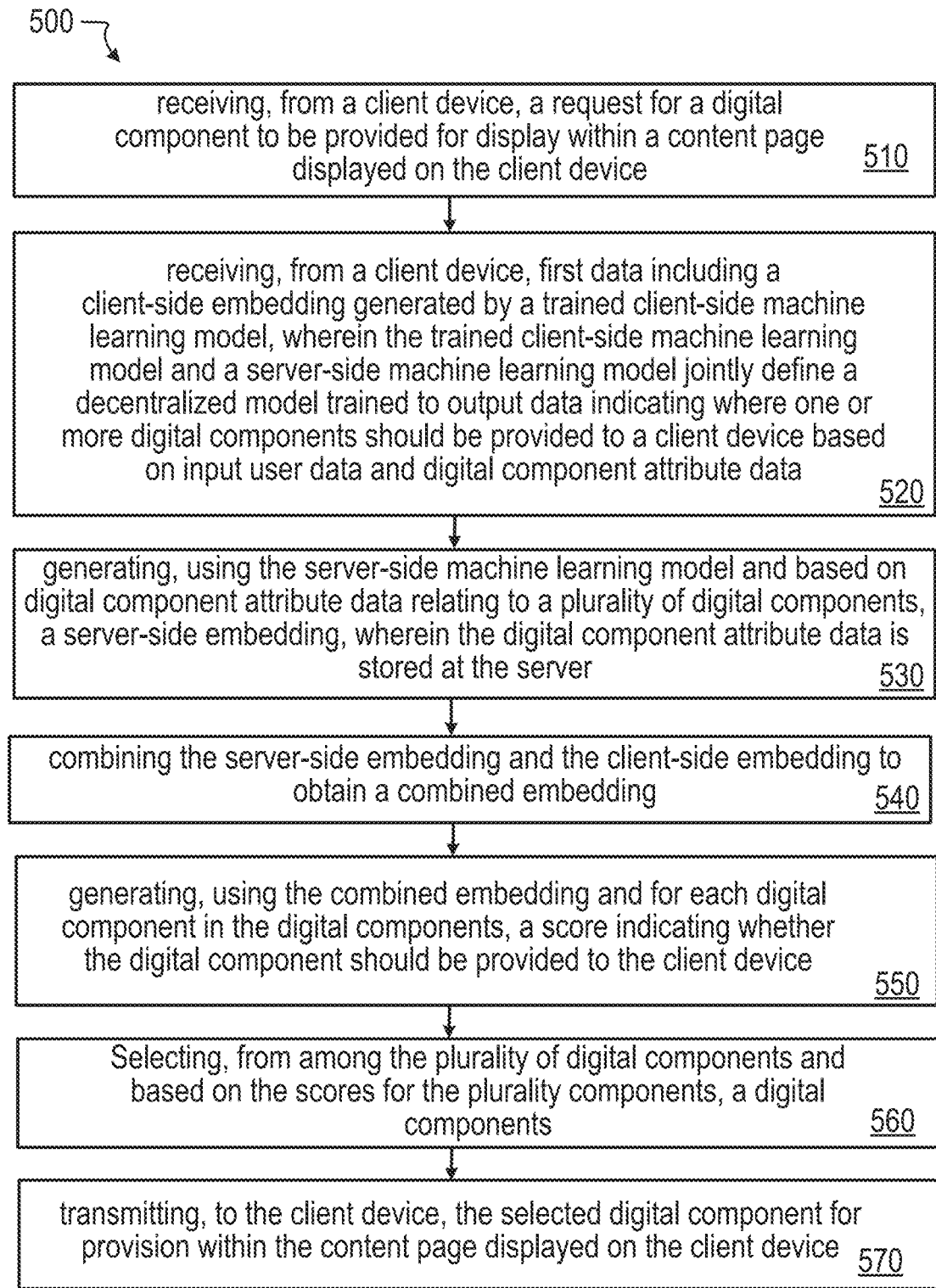

receiving, from a client device, a request for a digital component to be provided for display within a content page displayed on the client device     510 receiving, from a client device, first data including a client-side embedding generated by a trained client-side machine learning model, wherein the trained client-side machine learning model and a server-side machine learning model jointly define a decentralized model trained to output data indicating where one or more digital components should be provided to a client device based on input user data and digital component attribute data     520 generating, using the server-side machine learning model and based on digital component attribute data relating to a plurality of digital components, a server-side embedding, wherein the digital component attribute data is stored at the server     530 combining the server-side embedding and the client-side embedding to obtain a combined embedding     540 generating, using the combined embedding and for each digital component in the digital components, a score indicating whether the digital component should be provided to the client device     550

Selecting, from among the plurality of digital components and based on the scores for the plurality components, a digital components     560 transmitting, to the client device, the selected digital component for provision within the content page displayed on the client device     570

FIG. 5

PRIVACY-ENHANCED TRAINING AND DEPLOYMENT OF MACHINE LEARNING MODELS USING CLIENT-SIDE AND SERVER-SIDE DATA

CROSS-REFERENCE TO RELATED APPLICATIONS

This application is a National Stage Application under 35 U.S.C. § 371 and claims the benefit of International Application No. PCT/US2022/023438, filed Apr. 5, 2022, which claims the benefit of priority to Indian Application No. 202221008565, filed Feb. 18, 2022, the entirety of which is incorporated herein by reference.

BACKGROUND

This specification generally relates to data processing and privacy-enhanced training and deployment of machine learning models that operate on data resident on client-side device(s) and server-side device(s).

Machine learning is a type of artificial intelligence that aims to teach computers how to learn and act without necessarily being explicitly programmed. More specifically, machine learning is an approach to data analysis that involves building and adapting models, which allow computer executable programs to "learn" through experience. Machine learning involves design of algorithms that use training data to adapt their models to improve their ability to make predictions. For example, during model training using a set of training data, rules or relationships can be identified, and used to configure the weights for the various parameters of the machine learning model. Then, using a new set of data, the trained machine learning model can generate a prediction or inference based on the identified rules or relationships. Machine learning models can be applied to a variety of applications, such as search engines, medical diagnosis, natural language modeling, autonomous driving, etc.

In some applications, the data used for training a machine learning model (and/or for subsequently drawing inferences using a trained machine learning model) can be resident/stored at different devices, e.g., one or more client-side devices (such as a user's computing device) and one or more server-side devices (such as a server operated by a content platform or a content provider that provides content to the client-side device). One such application can relate to content personalization which can generally involve training and deploying a machine learning model that predicts a particular digital component to provide for display on a client device, where the model uses both client-side data and server-side data, such as attributes of available digital components, which are stored at a server, and data about user's interests and preferences, which are stored at a client device.

SUMMARY

In general, one innovative aspect of the subject matter described in this specification can be embodied in methods that include the operations of obtaining client-side training data that includes a plurality of features and a corresponding plurality of training labels by a client device and using user activity data stored at the client device; and training, by the client device, a decentralized model in a plurality of training rounds, wherein the decentralized model is (1) trained to output data indicating whether one or more digital components should be provided to a client device based on input user activity data and digital component attribute data, (2) includes a client-side machine learning model and a server-side machine learning model, and (3) trained while ensuring joint differential privacy. The operation of training, by the client device, in each training round of the plurality of training rounds can comprise receiving, from a server, first data including a current server-side embedding generated by the server-side machine learning model, wherein the first data received from the server does not include any server-side features used in generating the current server-side embedding; updating, using current server-side embedding and based on the plurality of training labels, the client-side machine learning model; generating, using the updated client-side machine learning model, an updated client-side embedding; and transmitting, by the client device and to the server, second data including the updated client-side embedding for subsequent updating of the server-side machine learning model.

Another innovative aspect of the subject matter described in this specification can be embodied in methods that include the operations of obtaining server-side training data that includes a plurality of features and a corresponding plurality of training labels by a server and using server-side data obtained from a server-side user; and training, by the server, at least part of a decentralized model in a plurality of training rounds, wherein the decentralized model is (1) trained to output data indicating whether one or more digital components should be provided to a client device based on input user activity data and digital component attribute data, and (2) includes a client-side machine learning model and a server-side machine learning model. The operation of training, by the server, in each training round of the plurality of training rounds can comprise: receiving, from a client device, second data including a current client-side embedding generated by the client-side machine learning model, wherein the second data received from the client device does not include any client-side features used in generating the current client-side embedding; updating, using server-side embedding and the current client-side embedding and based on the plurality of training labels, the server-side machine learning model; generating, using the updated server-side machine learning model, an updated server-side embedding; and transmitting, by the server and to the client device, first data including the updated server-side embedding for subsequent updating of the client-side machine learning model.

Yet another innovative aspect of the subject matter described in this specification can be embodied in methods that include the operations of receiving, from a client device, a request for a digital component to be provided for display within a content page displayed on the client device; receiving, from the client device, first data including a client-side embedding generated by a trained client-side machine learning model, wherein the trained client-side machine learning model and a server-side machine learning model jointly define a decentralized model trained to output data indicating whether one or more digital components should be provided to a client device based on input user activity data and digital component attribute data; generating, using the server-side machine learning model and based on digital component attribute data relating to a plurality of digital components, a server-side embedding, wherein the digital component attribute data is stored at the server; combining the server-side embedding and the client-side embedding to obtain a combined embedding; generating, using the combined embedding and for each digital component in the plurality of digital components, a score indicating whether the digital component should be provided to the client device; selecting, from among the plurality of digital components and based on the scores for the plurality of digital components, a particular digital component; and transmitting, to the client device, the particular digital component for provision within the content page displayed on the client device.

Other embodiments of this aspect include corresponding systems, apparatus, and computer programs, configured to perform the actions of the methods, encoded on computer storage devices.

As described above, machine learning models can be utilized for various applications in which the model leverage—during training and at inference—data that is stored at one or more client device(s) and one or more server-side device(s), where each device has a different owner or is operated by a different entity. Particular embodiments of the subject matter described in this specification can be implemented so as to realize one or more of the following advantages.

The subject matter disclosed herein enables privacy-enhanced training and deployment of a machine learning model that utilizes server-side data and client-side data, which are each maintained and operated upon during training and deployment in isolation from each other. In addition, the proposed methods can guarantee joint differential privacy, and exhibit better data privacy/utility trade-offs than conventional methods. This is illustrated by contrasting the subject matter described herein with some conventional solutions that use client-side and server-side data during model training and deployment. For example, some conventional machine learning models that are trained and deployed using client-side data and server-side data utilize centralized techniques that can take one of two forms: (1) combining the client-side data and the server-side data by moving the client-side data to servers, where the server-side data locate; or (2) combining by moving the server-side data to client devices, where the client-side data locate. However, such techniques result in the commingling of client-side data and server-side data at a particular device (such as either the client device or server device), thus resulting in private client-side data being exposed to owners of servers, and/or private server-side data being exposed to users of client-side devices. Moreover, such commingling of server-side and client-side data at a single device can require and consume a large number of computing resources than what may be available at any particular device. For example, the amount of server-side data used as part of the training of a machine learning model can consume a significant amount of network and memory resources required to transfer such data to the client device and store this data at the client device. Existing methods such as Federated Learning (FL), may allow this data separation but do not guarantee joint differential privacy.

In contrast, the techniques described herein enable complete separation and isolation of server-side data sources and client-side data sources during training of the machine learning model (and subsequently during inference by the machine learning model) as well as ensuring joint differential privacy. In doing so, the server-side data on a particular server is not shared with or otherwise accessible by a client device (or another server device), and conversely, client-side data stored at a particular client device is not shared with or otherwise accessible by a server device (or another client device). At the same time, the methods herein utilizes joint differential privacy to ensure that the data on the server side or client side may not be easily inferred by the other side by using other information available to them, e.g., the training model. Joint differential privacy, as one skilled in the art would appreciate, can deal with data security and privacy problems by adding "noise" or randomness to the data so that any user raw data cannot be identified. The training algorithms herein with joint differential privacy may guarantee that for any party A (client or server), the other parties (other clients and servers) cannot easily make inferences about party A's data. As such, data privacy over each client and server device's data is maintained, thus resulting in a more secure training and deployment of machine learning models that operate on client- and server-side data. In some implementations, such enhanced data security and privacy is enabled by providing a decentralized model including a separate client-side submodel for each client device and a separate server-side submodel for each server. In such implementations, each device's model is trained iteratively using data stored at that device and embeddings received from one or more other devices, where such embeddings are derived from raw data stored at the one or more other devices, but cannot be transformed back to the raw data from which they are derived. In this manner, data security and privacy is maintained over each device's raw data while still enabling collaborative training of the overall model. Similarly, at inference time, each device's model uses data stored at that device and embeddings received from one or more other devices.

Relatedly, the above-described techniques provide enhanced privacy and data security in a resource efficient manner. As described above, training and inferences of the server-side submodel can occur on the server(s) while training and inferences of the client-side submodel can occur on the client device(s). Therefore, the server-side data can be as large as a server can handle, and similarly, client-side data can be as large as a client device can handle, with each device only transmitting its embeddings (as opposed to the raw data) to the other device(s). As such, the techniques described herein are resource efficient in that only a small fraction of data in the form of embeddings is transmitted (e.g., over a network) between devices—as opposed to the much larger raw dataset used in generating those embeddings—and the smaller dataset in the form of embeddings is used in the model of the receiving device (i.e., server or client-side device). In this manner, significant computing resource efficiencies are achieved in the form of reduced network resources for transmitting the embeddings data (as opposed to the underlying raw data) between devices, and the reduced memory and computing processing resources needed to train a particular device model or draw inferences using the received embeddings (as opposed to the larger raw dataset).

The methods herein advantageously utilize joint differential privacy for training and making inferences using the decentralized model. When comparing with existing methods for recommending a personalized product or service, e.g., existing federated learning (FL) methods, the systems and methods herein are more efficient in training the model or making inferences with similar privacy constraints. Existing FL-based techniques does not take advantage of the client-server data separation and joint differential privacy. The methods herein advantageously utilize both the data separation (e.g., client-side data and server-side data) and model separation (e.g., client model(s) and server model(s)) to improve data privacy or data security, for example, the data privacy and quality trade-off. As an example, the methods herein may allow clients to perform non-private computations on their own data, based on the parameters of the server models. This can lead to better model quality under a given data privacy or data security budget.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows a flow diagram of an example process for the client device to train the client-side submodel of the decentralized model.

FIG. 4A-4B illustrate a flow diagram of an example process for the server to train the server-side submodel of the decentralized model.

FIG. 5 illustrates a flow diagram of an example process for making inference(s) using the decentralized model.

Like reference symbols in various drawings indicate like elements.

DETAILED DESCRIPTION

Figure 1:
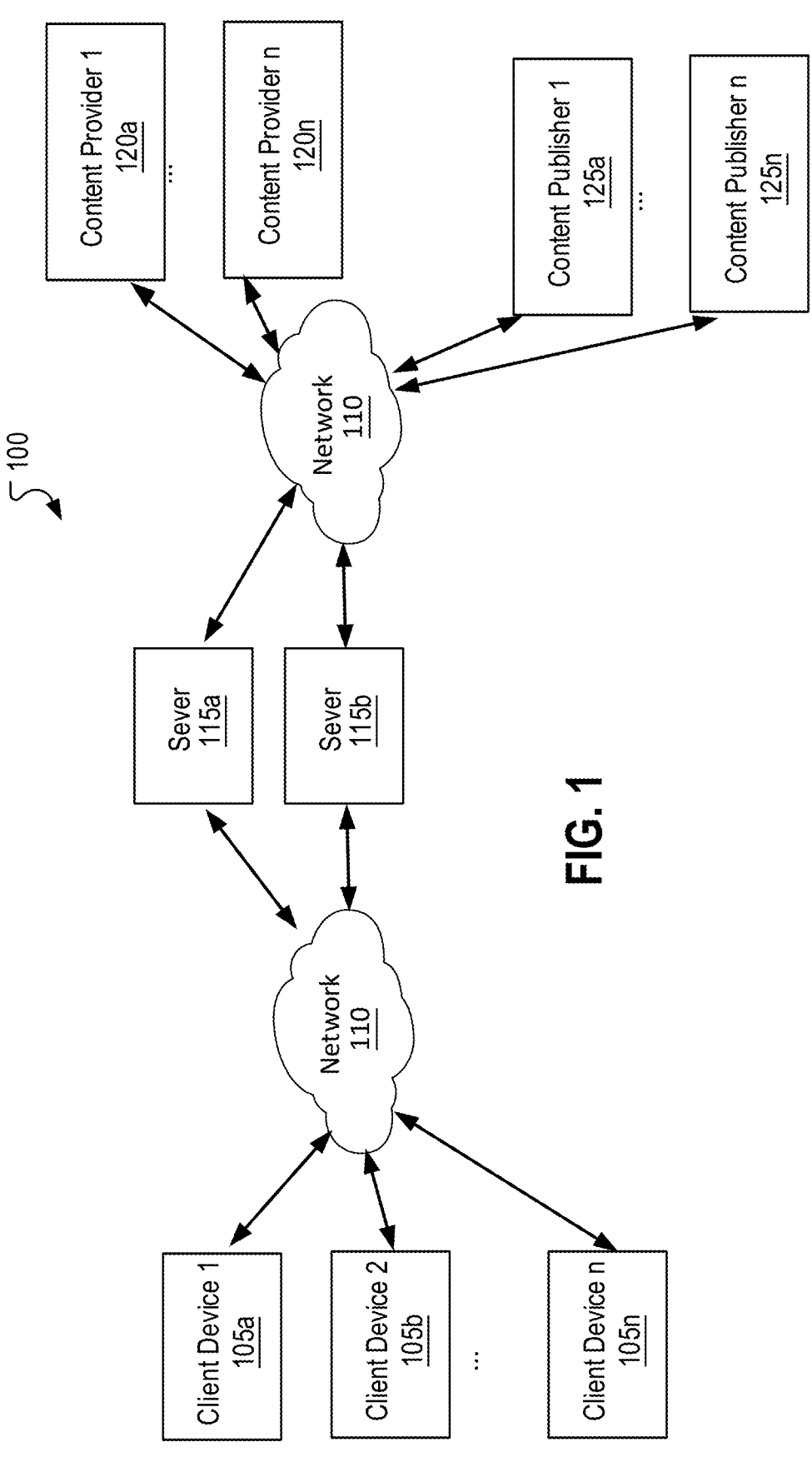
FIG. 1 is a block diagram of an example environment including the server, server-sided entities, and client devices for training or making personalized inferences using the decentralized machine learning model.

As summarized here (and above), and as described in greater detail with reference to FIGS. 1-6, this specification describes techniques for training a machine learning model to perform a particular task based on data that is stored on multiple different devices, e.g., one or more client-side device(s) and one or more server-side device(s). The task performed using such machine learning models utilize, as input, client-side data and server-side data, and generate an output that makes inferences on a user, an inference about a user, or both.

As described above, the techniques described herein can be utilized in various applications involving different machine learning tasks. However, for brevity and ease of explanation, these techniques are described below with reference to an example application in which a machine learning model is utilized to select a particular digital component (from among multiple available digital components) to be provided for display on a client device, where the machine learning is trained using and draws inferences based on client-side data, which can include, e.g., data stored on the client device regarding the user's content preferences and interests, as well as server-side data, which can include, e.g., attributes relating to various digital components (e.g., type of the digital component, its size, its subject matter). As one example, the task may be selecting a digital component such as an advertisement for display to a user based on the user's online preferences and/or based on attributes of available digital components. As another example, the machine learning task can be a recommendation of movies, merchandise to purchase, apps, websites, or books to read, e.g., based on the user's preferences and digital component interaction history (as stored at the client device) and attributes relating to digital components (movies, merchandise to purchase, apps, websites, or books to read).

As used throughout this document, the phrase "digital component" refers to a discrete unit of digital content or digital information (e.g., a video clip, audio clip, multimedia clip, image, text, or another unit of content). Generally, digital components are separate from the content, and are selected for presentation based on the context in which the content is being played (e.g., day, time, user characteristics, and device characteristics). For example, digital components can be selected by, and provided by, a different system (e.g., a digital component system) than the system that provides the digital content. Furthermore, the digital components are generally created by an entity other than the entity that created the content and therefore, are considered third party content relative to the content.

In some implementations, a machine learning model can be trained to output data indicating/predicting one or more digital components that should be provided to a client device based on client-side data and server-side data. The machine learning model can be divided into two or more machine learning sub-models, which is equivalent to "towers." For ease of description, this description assumes that the machine learning model is divided only into two submodels: a client-side machine learning submodel and a server-side machine learning submodel; however, it will be appreciated (and as described further in this specification, the machine learning model can be divided into any number of client-side machine learning submodels and any number of server-side machine learning submodels.

Each of the divided models—i.e., the client-side submodel and the server-side submodel—is trained in multiple rounds, with each round alternating between training the client-side submodel and then the server-side submodel.

As part of the client-side submodel's training, the client device obtains server-side embeddings generated by the server-side machine learning submodel, where the server-side embeddings does not include any server-side data, e.g., server-side training feature, used in generating the server-side embedding(s). The client device also generates client-side embedding based on the client-side training data. The client device combines the server-side embedding with the client-side embedding and uses the combined embedding to train the client-side machine learning submodel and generate updated client-side embeddings. The updated client-side embedding is transmitted to the server for subsequent training of the server-side submodel. In some cases, the client-side training data herein can include the client features and the client-side training labels. The client-side training features, used in generating the updated client-side embedding, can remain on the client side and not be transmitted to the server side. The client-side training labels may be transmitted to the server side. The methods disclosed herein can advantageously guarantee joint-differential privacy of both the training features and the training labels, therefore the training features and training labels cannot be easily inferred by the server side or by other client-side devices. As such, the methods disclosed herein improves data security and privacy over traditional methods. During training on the client-side machine learning submodel, parameters of the server-side machine learning submodel are kept unaltered (and similarly, during training of the server-side machine learning submodel, parameters of the client-side machine learning submodel remain fixed).

During training of the server-side machine learning submodel, the server can use client-side embedding generated by the client-side machine learning submodel (where the client-side embedding does not include any client-side data, e.g., client-side training features, used in generating such client-side embedding nor can such client-side data be easily derived from machine learning submodels residing on other clients and servers. The server combines the server-side embedding and client-side embedding and uses the combined embedding to train the server-side machine learning submodel and generates an updated server-side embedding. Such updated embedding can be transmitted to the client device for subsequent training on the client side.

In this manner, the training alternates between client-side training and server-side training, and can continue until a pre-determined number of rounds of training have been performed or until a predetermined learning threshold of the machine learning submodel has been reached. The predetermined learning threshold can be determined or altered based on different training datasets. The predetermined learning threshold can be determined on but is not limited to a desired training outcome, e.g., convergence, to avoid overfitting and/or underfitting.

The trained machine learning model can be used for making a prediction after receiving a request for a digital component to be provided for display within a content page displayed on the client device. Such prediction may occur on the client side or the server side. When it occurs on the server side, the trained client-side machine learning submodel can generate a client-side embedding that is transmitted to the server, where the server-side machine learning submodel can generate server-side embedding(s) and combine it with the client-side embedding that is then used to generate an inference specifying the digital component that should be provided to the client device. A digital component can then be selected and provided for display on the client device, e.g., within a content page displayed on the device. In some implementations, the client-side data can include a device user's online activity data, such as websites the user visited, digital components that the user interacted with (e.g., digital components that were clicked or those that were viewed for a certain threshold amount of time, types of interactions, etc.). As an example, the client-side data includes activities related to users' interactions with content pages as well as stored content preferences or interests with respect to content on pages. In some implementations, the client-side data can include personal interests, contact information, affiliations, preferences, or any other personal information of the user. The client-side data can include various data that the user may consider private, proprietary, confidential, or sensitive. The client-side data can be various data that a user may not want to share with any other users or entities for various reasons including but is not limited to privacy or security.

The server-side data can include data that is related to a server's operation or a server-side entity's operation. For example, the server-side data for a particular server (e.g., a content provider's server) can include attribute data of digital component(s) that the server can provide to one or more client devices, which can include data related to various attributes of digital component(s) that are available to be provided such as type, duration, formats, sizes, landing pages, products or services associated therewith, and/or brands associated therewith. As another example, the server-side data for a server (such as, e.g., a content platform's server) include data relating to available inventories, including corresponding safety configurations, crowding rules, floor prices, formats or sizes that can be accepted, and contents they display. As with the client-side data, the server-side data for the one or more servers can include data that the entity operating such server(s) may consider private, proprietary, confidential, or sensitive.

These features and additional features are described in more detail below.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 shows a block diagram of an exemplary environment/system 100 for training the decentralized model or making personalized inferences. One or more client devices 105a-105n can communicate via one or more networks 110 with one or more content providers 120a-120n, which can be generally referred to as content providers 120, and with one or more content publishers 125a-125n, which can be generally referred to as content publishers 125. The client devices 105 can be generally referred to as client device(s) 105. The client devices 105 can communicate with the content providers 120 or content publishers 125 via one or more servers 115a, 115b, which can be generally referred to as server(s) 115.

The client devices 105 can include any type and form of computing device, including a desktop computer, laptop computer, portable computer, tablet computer, wearable computer, embedded computer, smart television, console, Internet of Things (IoT) device or smart appliance, or any other type and form of computing device. The client devices 105 can communicate via the networks 110 with one or more content providers 120 and/or content publishers 125. Responsive to a request from the client devices 105, the content provider or publisher 125 transmit or otherwise provide primary content (e.g., a web page) to the client device 105 by using the server(s) 115. For example, the client device 105a can execute an application to request content. The application can be a web browser, social media application, video game, or other such application. The client device 105 can request content from the server(s) 115. For example, the server(s) 115 can host web pages that include content slots. The content slots of the web pages can include JavaScript or other processor-executable instructions that can cause the client device 105a to request content from the content provider 120 or the content publisher 125 to fill the content slots. The processor executable instructions can be provided to the server(s) 115 by the content servers 120 or content publishers 125.

The environment/system 100 can include one or more networks 110. The one or more networks 106 can include any type or form of communication network, including local area networks (LANs), wide area networks (WANs) such as the Internet, satellite networks, cable networks, broadband networks, fiber optic networks, microwave networks, cellular networks, wireless networks, or any combination of these or other such networks. The system/environment 100 can include multiple networks 110 of the same or different types. For example, the network 110 between the client device 105 and the server(s) 115 can be of a first type, and the network 110 between the server(s) 115 and the content servers 120 and content publisher 125 can be of a second type. The network 110 between the client device 105 and the server(s) 115 and the network 110 between the server(s) 115 and the content servers 120 and content publisher 125 can be the same network or components of the same network.

The networks 110 can include multiple additional devices, including, for example, gateways, modems, firewalls, routers, switches, etc. The networks 106 can include any number of computing devices (e.g., computer, servers, routers, network switches, etc.) that are configured to receive and/or transmit data within networks 110. The networks 110 can include any number of hardwired and/or wireless connections. A client device 105a can communicate wirelessly (e.g., via WiFi, cellular, radio, etc.) with a transceiver that is hardwired (e.g., via a fiber optic cable, a CAT5 cable, etc.) to other computing devices within the networks 110. The networks 110 can include or can be virtual networks, such as a virtual network between multiple virtual machines executed by a single physical machine, or an abstract network such as an offline transfer of data via physically movable media (e.g. a Sneakernet, transferring data via tape media, CD-ROM, flash media, external hard drives, floppy disks, etc.).

The environment system 100 can include one or more servers 115. The server(s) 115 can manage content requests received from the client device 105. The content requests can be for a digital component, which can also be referred to as secondary content or content items, to render in content slots of the primary content. The server 115 can fulfill the content request from multiple content servers 120 or content publisher 125. For example, the server(s) 115 can receive a request for content from the client device 105a and can select from among content provider 120a to provide the requested content. The selection can be via load balancing algorithms, auction algorithms (e.g. with the content servers 120 bidding for opportunities to provide content), etc. The server(s) 115 can thus be referred to as an exchange server, a load balancer, an auction provider, or by any other such term. In some implementations the communication, e.g., a content request, may be directly transmitted to or received from a content provider 120 or a content publisher 125 without any intermediary server(s) 115.

The environment/system 100 can include one or more content providers 120. The content provider 120 can include servers or other computing devices operated by a content providing entity to provide information resources including digital components for display via the network 110 on the client devices 105. The content providers 120 can include content repositories that store multiple digital components. The content providers 120 can select one or more digital components from the content repositories in response to receiving a content request from the server 115 or directly from the client device 105a. In some implementations, the content request from the client device 105a can include an identifier, such as a cookie, provided to the client device 105a by the content providers 120 in an earlier data exchange.

The environment/system 100 can include one or more content publishers 125. The content publisher 125 can include servers or other computing devices operated by a content publishing entity to provide information resources including primary content for display via the network 110. For instance, the content publisher 125 can include a web page operator who provides primary content for display on the information resource. The information resource can include content other than that provided by the content publisher 125, such as content slots configured for the display of digital components from the content provider 120. For instance, the content publisher 125 can operate the website of an entity or a user and can provide content about that entity or user for display on web pages of the website. The web pages can include content slots configured for the display of digital components provided by the content provider 120 or by the content publisher 125. In some implementations, the content publisher 125 includes a search engine computing device (e.g. server) of a search engine operator that operates a search engine website. The primary content of search engine web pages (e.g., a results or landing web page) can include results of a search as well as third party digital components displayed in content slots of the information resource such as digital components from the content provider 120. In some implementations, the content publisher 125 can include one or more servers or devices for providing video content. The content publishers 125 can include content repositories. The content providers 120 can select content from the content repositories in response to receiving a content request from the server 115 or the client device 105a. In some implementations, the content request from the client device 105a can include an identifier, such as a cookie, provided to the client device 105a by the content providers 120 in an earlier data exchange. The content providers 120 can select content from the content repository based on the identifier. For example, content providers 120 can associate the identifier with such as, but not limited to, preferences and computational resources of the client device 105 (e.g., screen size and resolution), among others. The content providers 120 can select the content from the data repository based on the data associated with the identifier.

The server 115, the content providers 120, and the content publisher 125 can include any type and form of computing device, including desktop computers, servers, workstations, laptop computers, portable computers, embedded computers, or any other type and form of computing device. The servers 115, the content providers 120, and the content publisher 125 can include virtual machines executed by one or more physical computing devices, and can be configured as a server farm, cluster, or cloud of devices.

As described with reference to FIGS. 2-5, the content provider 120 can identify and select digital components, where such identification and selection is done by the content provider 120 without receiving any raw user/client-side data that informs the digital components to be identified and selected.

Figure 2A:
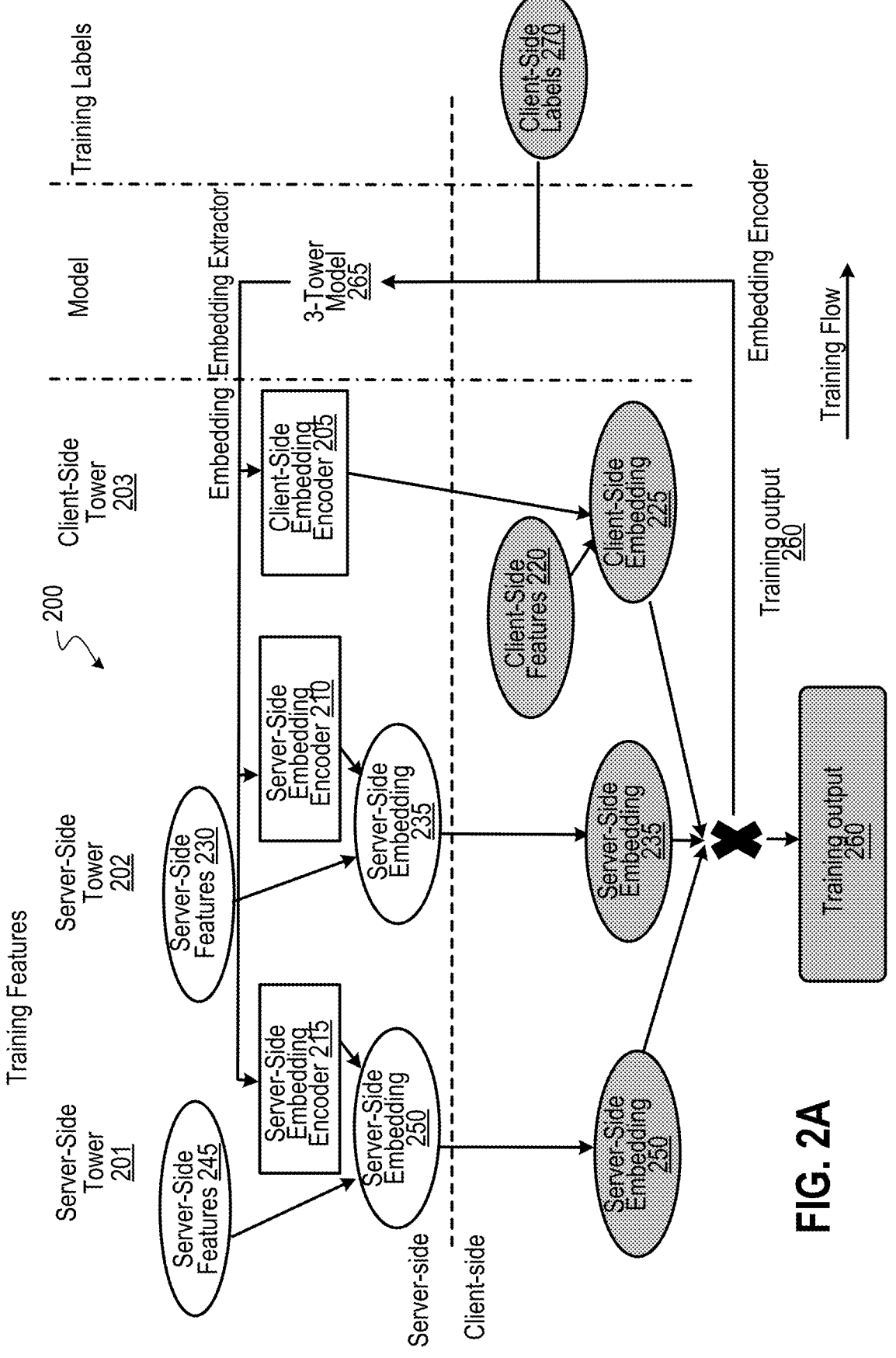
FIG. 2A is a block diagram of an example method for training the decentralized machine learning model with data separation between the client-side data and the server-side data.

FIG. 2A illustrates a block diagram of an example method 200 for training a decentralized machine learning model 265 that can be applied to make personalized recommendations. The method 200 may be configured to perform one or more operations on the client device as well as on a server. Operations of the method 200 can be implemented for example by the components of the system described and depicted with reference to FIG. 1. Operations of the process 200 can also be implemented as instructions stored on one or more computer readable media which may be non-transitory, and execution of the instructions by one or more data processing apparatus can cause the one or more data processing apparatus to perform the operations of the process 200. In some implementations, the method 200 is configured to be performed by one or more computer systems or devices disclosed herein with complete data separation between the client-side data and the server-side data.

The method 200 can include training a decentralized machine learning model 265 that can be separated into one or more client-side towers 203 (each corresponding to a machine learning submodel for a particular client device 105) and one or more server-side towers 201-202 (each corresponding to a machine learning sub model for a particular server, such as a content publisher 125 server or a content provider 120 server). In this particular implementation, the decentralized machine learning model 265 is separated into two server-side towers 201-202 and one client-side tower 203. However, this 3-tower decentralized model can be generalized to include various numbers of client-side tower(s) and server-side tower(s), the numbers being non-zero integers. The "towers" 201-203 herein can include a machine learning submodel 205, 210, 215, and data corresponding thereto, for example, the data features 220, 230, 245 and/or embeddings 225, 235, 250.

There can be one or more server-side towers 201-202, thus machine learning submodels 210, 215, residing on the server(s) 115 in FIG. 1. The server-side towers 201-202 can each maintain corresponding server-side data separately and include as input corresponding server-side features 230, 245 that can be derived from raw server-side data. Such server-side features are separately included by corresponding servers. The server-side features 230, 245 can then be used by corresponding server-side machine learning submodels 210, 215 for generating server-side embedding(s) 235, 250. Such server-side embeddings 235, 250 can be transmitted or otherwise communicated to the client device(s) 105 in FIG. 1, while the raw server-side data and the server-side features 230, 245 derived therefrom stay on the server side and are not shared with or accessible by the client device. The server-side embedding(s) 235, 250 can be combined 260, e.g., with each other and also with client-side embedding(s) 225, to generate a training output. The training output can be generated either on the server-side or the client-side. The training output can be used together with client-side training labels 270 to update the decentralized machine learning model 265. The client side training labels 270 can be transmitted securely to the server-side by the client device.

There can be one or more client-side towers, each residing on an individual client device 105 in FIG. 1. The client-side machine learning submodel 205 can each take as its input client-side features 220 that can be derived from raw client-side data for generating client-side embedding(s) 225. Such client-side embedding(s) 225 can be transmitted or otherwise communicated to the server 115 in FIG. 1, while the raw client-side data and the client-side features 220 derived therefrom stay only on the client device 105 and are not shared with or accessible by the server—side devices. The client-side embedding(s) 225 can be combined 260 with server-side embeddings 235, 250, to generate the training output. The client-side submodel(s) 205 can reside on the server side, the client side, or both.

The server-side towers 201, 202 can each include a corresponding number of server-side entities, $n_1$ or $n_2$, respectively. Each server-side entity is identified as $v_1 \in [1, \ldots, n_1]$ and $v_2 \in [1, \ldots, n_2]$. The client-side submodel may include one or more users or client-side entities (generalized as "user" herein), denoted by m, and each user or client-side entity is identified as $u \in [1, \ldots, m]$.

A first server-side submodel and a second server-side submodel can be denoted as: $f_1: U_1 \rightarrow R^{d1}$; and $f_2: U_2 \rightarrow R^{d2}$.

The first client-side submodel can be represented by $g: V \rightarrow R^{d3}$, where $f_1(\ )$, $f_2(\ )$, and $g(\ )$ represent corresponding server-side submodel or client-side submodel, and the $R^1$, $R^2$, and $R^3$ are corresponding vector domains for the embedding(s), where $U_1$ represents features of the first server-side submodel, $U_2$ represents features of the second server-side submodel, and V represent features of the client-side submodel.

For any $(u, v_1, v_2)$, r can be the corresponding label or response from a certain domain S, where $r \in S$. The sample set of $\{(u, v_1, v_2, r)\}$ tuples can be represented by Z. The corresponding minimization problem for training the decentralized machine learning model 265 becomes the following:

$$f_1^*, f_2^*, g^* = \arg\min \Sigma_{(v_1, v_2, u, r) \in Z}\, l[\varnothing(f_1(v_1), f_2(v_2), g(u)), r] \tag{1}$$

where l is the loss function defined on $R^1 \times R^2$, and $\phi$ is a function that combines the embedding vectors into a scalar, wherein $\phi: R^{d1} \times R^{d2} \times R^{d3} \rightarrow R$. The combination can be a dot product or a tensor product, and the value of $\phi$ function can be a scalar, obtained from the combination of vectors representing the embedding(s) herein.

To train the decentralized machine learning model 265, each machine learning model 205, 210, 215 comprised in the decentralized model 265 can be trained in alternating rounds using alternating minimization (AM), which can improve the computation efficiency for training. The AM algorithm may alternate between different stages, each stage corresponding to a tower. During a client stage, only the model parameters for that client tower are updated, while the model parameters of other towers are kept fixed. Similarly, during a server stage, only the parameters for that tower are updated. The methods herein advantages utilize this submodel separation provided by AM to improve the model quality at a given privacy budget over existing methods. During the client training/inference rounds, non-private computation can be performed on the client device with the client data, for example by applying several steps of gradient descent without noise. Then privacy protection is added when the client embeddings are transmitted to the server during a server training/inference round. In this implementation, each model 205, 210, 215 comprised in the decentralized model is only updated during its corresponding training rounds while kept unaltered in other rounds.

The training of the decentralized machine learning model 265 may include an initialization round in which each model 205, 210, 215 can be initialized as $f_1(0)$, $f_2(0)$, and $g(0)$. After the initialization round, the minimization problem in equation (1) may be repeated for a number of training rounds with each round alternating between the server side and the client side (or vice versa), and the current round being represented by t, where $t \in [1, \ldots, T]$.

Server-Side Model Training

The server may each train a corresponding server-side submodel 210 or 215 to output data indicating whether one or more digital components should be provided to a client device.

In some implementations, the server 115 may be different devices from the content provider 120 and content publisher 125, as shown in FIG. 1. In other implementations where there is no intermediary device(s) connecting the client device(s) 105 and the content provider 120 and publisher 125, the server may be considered residing in the content provider 120 and content publisher 125, so that the content provider 120 and content publisher 125 may perform the server functions disclosed herein, which may include the server-side training thereon.

To train the server-side submodels 210, 215, the server(s) 115 may obtain multiple server-side features 230 245 that can be derived from information/data at the server (which are also generally referred to as server-side data). In some implementations, one server side submodel may correspond to server-side features, e.g., 230, obtained from the content provider 120, while a different server side submodel may correspond to server-side features, e.g., 245, from the content publisher 125.

As described above, the server-side data can include, among other data, data regarding digital component attributes. For example, the server-side data can include data that is related to a server's operation or an entity's operation. For example, the server-side data can include attribute data of digital component(s), which can include data related to various attributes of digital component(s) that are available to be provided such as type, duration, and/or product types of the digital component(s). The server-side data can include data of various entities residing on the server(s). The various entities can include a content provider and/or a content publisher. The various entities can include a buy-side entity and/or a sell-side entity. As another example, when the machine learning task is to recommend a personalized digital content to a user, e.g., a digital advertisement, the server-side data (for training and/or making the recommendation) can include available digital contents, and their formats, sizes, landing pages, products/services associated therewithin, and/or brands associated therewithin. The server-side data may also include available inventories, including corresponding safety configurations, crowding rules, floor prices, formats or sizes that can be accepted, and contents they display. The server-side data can include any data that a business entity may consider private or sensitive. The server-side data may include any data that cannot be shared with other business entities or users. For example, the server-side data may include statistical information of different user's responses to an advertisement inserted in a webpage. As another example, the server-side data may be a search volume of a specific search term by a specific group of users.

The server-side training round can occur immediately after initialization. Alternatively, server-side training can be performed immediately after a previous client-side training round or a previous server-side training round. For each server-side training round, taking the first server-side tower 201 as an example, the server 115 in FIG. 1 may receive, from one or more client devices 105, data including one or more current client-side embeddings 225 generated by the client-side machine learning submodel(s) 205. The current client-side embedding(s) 225 can be generated in an immediately previous or most recent client-side training round.

The data received by the server and from the client device(s) 105—i.e., the current client-side embedding(s) 225—does not include any client-side features 220 used in generating the current client-side embedding(s) 225, nor can the raw client-side data 220 be easily derived from the machine learning submodels, e.g., 201, 202, residing on other clients and servers, therefore ensuring data separation and joint differential privacy of client side and the server side. Such client-side data 220 includes the client-side features, but may or may not include the client-side labels. The client-side labels may be transmitted securely to the server side and protected by joint-privacy by the methods here. As such, raw client-side data is not shared with or otherwise accessible by (and is thus, isolated from) the server side. And, as described above, isolation of the client-side data 220 used in generating the current client-side embedding(s) from the server and/or other client device(s) results in the improved data privacy and security relative to conventional techniques for training models operating on client-side and server-side data.

The client-side data 220 can include data for multiple features that can be derived from activity data of the user owning the client device 105. For example, the client-side data can include a user's online activity data, such as websites the user visited, products the user browsed online, or social media posts the user visited. As another example, the client-side data includes activities related to users' interactions with content pages as well as stored content preferences or interests with respect to content on pages. The client-side data can include personal interests, contact information, affiliations, preferences, or any other personal information of the user. The client-side data 220 can be any data that the user may consider private, proprietary, confidential, or sensitive. The client-side data 220 can be any data that a user may not want to share with any other users or entities for various reasons including but is not limited to privacy or security.

The server 115 may generate a server-sided embedding 250 using the server-side submodel 210 based on the server-side training data, e.g., the server-side training features 245. The server-side data, e.g., the raw server data or the derived features 245 are not shared with or accessible by the client device. Similarly, the server-side training labels also stay on the server and remain completely separated from the client device.

The server-side submodel 210, 215 can be configured to intake features 230, 245 generated from raw server-side data and output corresponding embeddings 235, 250. Each model may include an embedding layer that transforms raw server-side data or features to server-side embedding(s). The embedding layer can generate the embedding(s) as its output, which can be used as an input for an encoder architecture. The embedding layer can generate different types of embeddings. The embedding(s) can be in a vector space, e.g., the Euclidean space. The embedding(s) herein can include: one or more embedding vectors, and/or one or more embedding matrixes, each combining multiple embedding vectors. Each model may include an encoder. Each model can be generalized to include a machine learning model structure such as a deep neural network. In some embodiments, the model can be various machine learning models that meet the computational complexity requirement or any other pre-determined requirements.

The server-side embedding(s) 250 can be combined 260 with the current client-side embedding(s) 225 using a dot product or tensor product to generate a model output.

While updating the server-side submodel 215, the parameters of the rest of the submodels, e.g., 205 and 210, can be kept fixed. The update of the server-side submodel 215 can be based on the solution to a minimization problem of a predetermined objective function over $f_1(\ )$ and/or $f_2(\ )$ based on the server-side training labels, e.g., $f_1(t+1)$, and $f_2(t+1)$. For example, the minimization problem can be solved via variants of stochastic gradient descent (SGD) or alternation least squares (ALS). When the server-side includes multiple submodels, the update of different submodels can be performed in parallel or in series, e.g., in a single server-side training round. The server-side embedding(s) 250 can then be updated using the updated server-side submodel 215, and the updated server-side embedding(s) 250 can be used in subsequent rounds by the server, the client device, or both. The updated server-side embedding(s) 250 may also be transmitted from the server to one or more client devices for updating the client-side submodel 205 in subsequent rounds. The updated server-side submodel can be broadcasted to all the server(s) and client device(s) so that each individual server or client device has an up-to-date copy of the trained model. Such broadcasting may occur at various time point(s) during the alternative training rounds, for example, at the end of the current training round or at the beginning of a subsequent training round.

Client-Side Model Training

To train the client-side submodel(s) 205, the client device 105*a* may obtain multiple client-side features 220 that can be combined with client-side training labels 270 to generate corresponding client-side training examples. The client-side features 220 can be stored on the client device and remains inaccessible to other devices such as the server during the model training or inferences to ensure improved privacy. The client-side training labels 270 can include information indicative of the ground truth values of the digital components. Such ground truth values can be related to user interest or preference of the digital components.

For a client-side training round, the client device may receive, from one or more servers, data including one or more current server-side embeddings 235, 250 generated by the server-side machine learning submodel(s) 210, 215. The current server-side embeddings 235,250 can be generated in an immediately previous or most recent server-side training round. Additionally, the client-side training round can be performed immediately after initialization or immediately after a previous client-side round or a previous server-side round.

The data received from the server do not include any server-side data or features derived therefrom 230, 245 that are used in generating the current server-side embedding(s) 235, 250. In other words, raw server-side data cannot be derived from the current server-side embedding(s) 235, 250 on the client side. As such, raw server-side data and corresponding features are completely separated from the client side. Isolation of the server-data and features 230, 245 from the server and/or other client-side device allows the computer systems and methods herein to provide improved data privacy and security than existing methods.

The server may maintain a current copy of the client-side submodel 205, and the client device 105 may download the current copy in its corresponding rounds to train the client-side submodel 205 on the client-side, and then transmit the updated copy to the server side.

The client-side machine learning submodel 205 can be configured to intake features 220 generated from raw client-side data, e.g., user activity data, and output corresponding embedding 225. Each submodel 205 may include an embedding layer. Each submodel may include the embedding layer that transforms raw client-side data or features to client-side embedding(s). The embedding layer can generate the embedding(s) as its output, which can be used as an input for an encoder architecture. The embedding layer can generate different types of embeddings. The embedding(s) can be in a vector space, e.g., Euclidean space. The embedding(s) herein can include: one or more embedding vectors, and/or one or more embedding matrixes, each combining multiple embedding vectors. Each submodel may include an encoder. Each submodel 205 can be generalized to include a machine learning model structure such as a deep neural network. The client-side submodel 205 may include a same or different machine learning model from one of the server-side submodels 210, 215.

The client device 105 may generate the client-side embedding 225 using the client-side submodel 205 and based on the client-side training data such as the training features. The client-side embedding(s) 225 can be combined 260 with the current server-side embedding(s) 235,250, e.g., using a dot product or tensor product to generate a combined embedding.

Then, the combined embedding can be used together with the client-side training labels 270 to update the client-side submodel 205. While updating the client-side submodel 203, the parameters of the rest of the submodels can be kept fixed.

The update of the client-side submodel 205 can be based on the solution to a minimization problem of a predetermined objective function based on the client-side training label as following:

$$\arg\min \Sigma_{(v_1,v_2,r)\in Z_u} l[\emptyset(f_1(v_1),f_2(v_2),g(u)),r] \qquad (2)$$

where $Z_u$ refers to tuples of Z corresponding to user u. Such minimization problem can be solved, e.g., via variants of stochastic gradient descent (SGD) or alternating least squares (ALS).

There can be various ways of solving the minimization problem in (2). For example, the minimization problem can be solved using SGD combined with joint differential privacy.

Joint differential privacy, as one skilled in the art would appreciate, can deal with data security and privacy problems by adding "noise" or randomness to the data so that any user raw data cannot be identified. Sufficient noise can be added to the state update procedure, e.g., the gradients in SGD at one or more stages to ensure differential privacy in AM.

Joint differential privacy can be a property of the training algorithm. The training algorithms herein with joint differential privacy may guarantee that for any party A (client or server), the other parties (other clients and servers) cannot easily make inferences about party A's data. There can be a difference between data isolation and joint differential privacy. Data isolation does not imply joint differential privacy, or vice versa. For example, data isolation may guarantee that the raw data is not transmitted across devices, but it may still be possible and easy for other parties to make inferences about the data through access to the trained model. Similarly, a training algorithm can be joint differentially private without guaranteeing data isolation. The methods proposed herein have both data isolation and joint differential privacy.

One skilled in the art will appreciate that the client-side submodel can be specific to a single client device (and the corresponding user), or can be aggregated based on data from multiple client devices (and their corresponding users) (and in this regard, constitutes a shared model). As such, in some implementations, the client-side submodel, go, can be a shared machine learning model that is based on feature datasets from different client devices that are mapped/encoded to a respective user/client device embedding. The shared machine learning model can be broadcasted to all users before or at the beginning of each client-side training round, then each client device computes a few gradient steps locally in an independent fashion, and sends gradients, e.g., capped and noisy, to the server(s). The server can then update the decentralized model, e.g., the client-side machine model, using a technique that guarantees joint differential privacy. The updated client-machine learning submodel can be downloaded by different client-devices before the next client-side training round starts.

As another example, the client-side submodel, go, can be linear, and in this case, the client-side submodel can include an embedding matrix with one embedding per user/client device. Each client device can maintain its own embedding independently without knowledge of other users '/client devices' embeddings.

Each client device can solve its minimization problem independently using its own embedding combined together in the combination operation 260 with server-side embeddings 235, 250.

In solving the minimization problem in (2), raw user activity data with respect to a client device of the user is not shared with or accessible by other users and client devices so that user data privacy and security is ensured.

The client-side embedding(s) 225 can then be updated using the updated client-side submodel 205, and the updated client-side embedding(s) 225 can be used in subsequent rounds by the server, the client device, or both. The updated client-side embedding(s) 225 may also be transmitted from the client device 105*a* to one or more servers for updating the server-side submodel 210, 215 in subsequent rounds. The updated client-side submodel can be broadcasted to all the individual server(s) and client device(s), so that each device can have an up-to-date copy of the trained model. Such broadcasting may occur at various time point(s) during the alternative training rounds, for example, at the end of the current training round or at the beginning of a subsequent training round.

In a subsequent round, or any training round on the server-side, the server 115 may generate a server-sided embedding 250 using the server-side submodel 210 based on the server-side training data, e.g., the server-side training features 245. The server-side data, e.g., the raw server data or the derived features 245, are not shared with or accessible by the client device. Similarly, the server-side training labels also stay on the server and remain completely separated from the client device. The server-side submodel 210, 215 can be configured to intake features 230, 245 generated from raw server-side data and output corresponding embeddings 235, 250.

In some implementations where each client side submodel is specific to a single client device, and there are multiple client devices, the decentralized model can be trained and/or deployed based on the combination of multiple different client-side submodels. In such implementations, each diem device can maintain a separate client model (including solely a client embedding), and the different client models are neither aggregated nor broadcast.

Figure 2B:
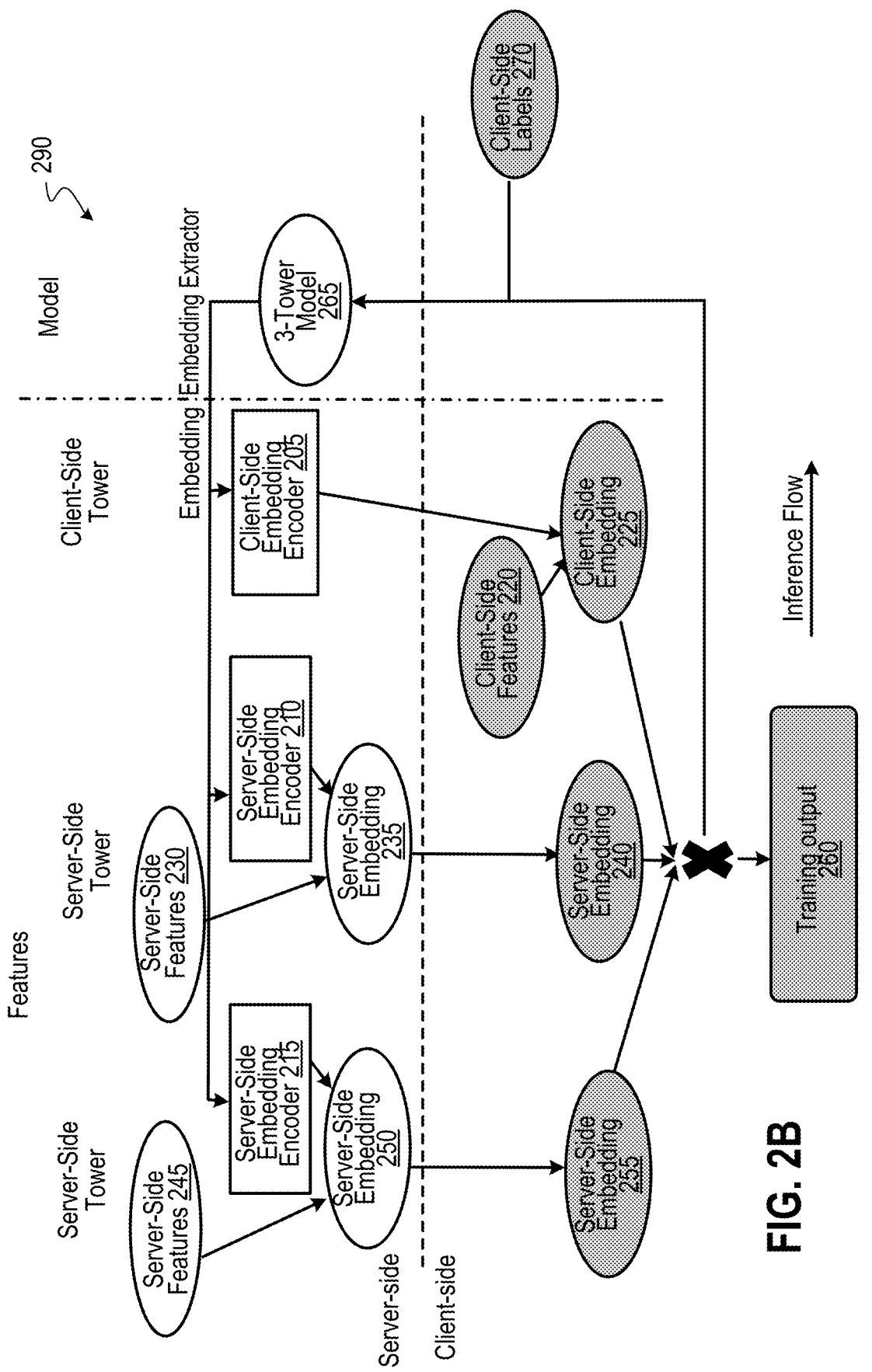
FIG. 2B is a block diagram of an example method for making an inference using the decentralized machine learning model with data separation between the client-side data and the server-side data.

FIG. 2B illustrates a block diagram of an example method 290 for making recommendations about services or products using the trained decentralized machine learning model 265. Operations of the method 290 can be implemented for example by the components of the system described and depicted with reference to FIGS. 1 and 2A. Operations of the process 200 can also be implemented as instructions stored on one or more computer readable media which may be non-transitory, and execution of the instructions by one or more data processing apparatus can cause the one or more data processing apparatus to perform the operations of the process 200. The method 290 is configured to be performed by one or more computer systems or devices disclosed herein with complete data separation between the client-side data and the server-side data.

In some implementations, the method 290 may be configured to perform one or more operations on the client side as well as on the server side. In some implementations, some or all the operations of the method 290 are performed on the client side, e.g., the combination embedding or recommendation is generated on the client side. In some implementations, some or all the operations of the method 290 are performed on the server side. Performing operation(s) on one-side but not the other side may depend on the amount of information or data that needs to be received from the other side so as to reduce the amount of client-server data communication and increase efficiency of the method 290. For example, when there are more server-side embeddings than client-side embeddings, it can be more efficient to transfer client-side embeddings to the server(s) for the server to make inferences. In some implementations, the method 290 makes recommendation(s) using the server-side and the client-side submodels that have been trained as disclosed herein, for example, in FIG. 2A.

When the recommendation is generated on the server side, the method 290 can include receiving a request, e.g., from a client device 105 in FIG. 1, for a digital component (to be provided for display within a content page presented on the client device 105). As described further below, the method 290 is to generate data identifying a particular digital component that is stored at and provided by a content provider 120. In some implementations, the digital components can include any type of content, including but not limited to, videos, movies, webpage, games, and apps. The digital component can correspond to various services and products.

The data output by the method 290 can be based on input user activity data stored at the client device 105 (i.e., the client device making the request) and digital component attribute data stored at one or more servers (e.g., one or more content provider servers 120 and one or more content publisher servers 125).

The server 115 in FIG. 1 may receive data including the client-side embedding 225 generated by the client-side submodel 205 from the client device. The client-side embedding 225 received from the client device does not include any client-side data, e.g., user activity data or data features 220, nor can the embedding be used to derive or otherwise determine the client-side data used to generate the embedding.

The server may utilize server-side data, or data features 230 derived therefrom as input for the trained server-side submodel 210, and generate a server-side embedding 235 using the trained server-side submodel 210. The server-side data is stored at the server and is not shared with or accessible by the client device. The server-side data can include data that is related to a server's operation or a server-side entity's operation. For example, the server-side data for a particular server (e.g., a content provider's server) can include attribute data of digital component(s) that the server can provide to one or more client devices, which can include data related to various attributes of digital component(s) that are available to be provided such as type, duration, formats, sizes, landing pages, products or services associated therewith, and/or brands associated therewith. As another example, the server-side data for a server (such as, e.g., a content platform's server) include data relating to available inventories, including corresponding safety configurations, crowding rules, floor prices, formats or sizes that can be accepted, and contents they display. As with the client-side data, the server-side data for the one or more servers can include data that the entity operating such server(s) may consider private, proprietary, confidential, or sensitive.

When the client-device' request is to recommend a personalized digital content to a user, e.g., a digital advertisement, the server-side data for training and/or making the recommendation can include available digital contents, and their formats, sizes, landing pages, products/services associated therewithin, and/or brands associated therewithin. In some implementations, the server-side data may also include available inventories, including corresponding safety configurations, crowding rules, floor prices, formats or sizes that can be accepted, and contents they display. The server-side data can include any data that a business entity may consider private or sensitive. The server-side data may include any data that cannot be shared with other business entities or users. For example, the server-side data may include statistical information of different user's responses to an advertisement inserted in a webpage. As yet another example, the server-side data may be a search volume of a specific search term by a specific group of users.

The server-side embedding(s) 235 can be combined 260 with the current client-side embedding(s) 225 using a dot product or tensor product to generate a combined embedding. The server-side embedding(s) 235 can also be combined 260 with other server-side embedding 250 corresponding to a different server-side submodel. Then, the combined embedding can be used to calculate a score for a corresponding digital component. The server may select one digital component as a recommendation based on the calculated scores. For example, the digital component with the highest score.

The selected component may be transmitted to the client device for provision to the client. When a server 115 is used as an intermediary device, it can use the identified digital component to request that digital component from the content provider 120 and upon receiving that component, it may provide it to the client device. When no intermediary device is used, the client device may directly request the digital component from the content provider 120. For example, the selected on-device advertisement may be transmitted to the client device for display within a content page displayed on the client device. In such implementations, the content provider 120 can implement its own model and the content publisher can implement its own model and that the embeddings of these models would be combined with those of the client-side submodel to generate the model output.

The parameters can be calculated based on the corresponding solution to a minimization problem of a predetermined objective function. Such minimization problem can be solved via variants of stochastic gradient descent (SGD) or alternating least squares (ALS). There can be many ways of solving the minimization problem. For example, the minimization problem can be solved using SGD combined with differential privacy. Further, sufficient noise can be added to the state update procedure, e.g., the gradients in SGD at one or more stages to ensure differential privacy in AM. The trained client-side submodel can be a shared machine learning model that maps user features to a user embedding among multiple client devices. Alternatively, there can be an independent client-side submodel for each client device. The server can combine multiple client-side sub-models received from multiple client devices (using a privacy-preserving aggregation method) to obtain an aggregated client-side submodel.

FIG. 3 illustrates a flow diagram of an example process 300 for training the decentralized model. Operations of the process 300 can be implemented for example by the components of the system described and depicted with reference to FIGS. 1 and 2A. For illustration, a computer system, e.g., client device 105 of FIG. 1, appropriately programmed in accordance with this specification, can perform the process 300. However, operations of the process 300 can also be implemented by any other suitable data processing apparatus, and can be configured as instructions stored on one or more computer readable media which may be non-transitory, and execution of the instructions by one or more data processing apparatus can cause the one or more data processing apparatus to perform the operations of the process 300.

As described above with reference to FIG. 2A, the decentralized model can be trained to output data indicating one or more digital components that should be provided to a client device based on at least input user activity data and digital component attribute data 320. The decentralized model is separated into a client-side submodel and one or more server-side submodels, as described herein. The client-side submodel is provided on a client device 105 and each server-side submodel is provided at a respective server. The training happens in multiple training rounds, with each training round including training of the server-side submodel(s) followed by training of the client-side submodel.

As described with reference to FIGS. 1 and 2A, to train the client-side submodel(s), the client device may obtain client-side training data that includes multiple client-side features (stored on the client device 105) and client-side training labels 270 to generate corresponding client-side training examples (at step 310).

The client device may train at least part of the decentralized model in multiple training rounds. The decentralized model is trained to output data indicating whether one or more digital components should be provided to a client device based on input user activity data and digital component attribute data 320. The decentralized model is a machine learning model that includes and can be separated into one or more client-side machine learning models and one or more server-side machine learning models.

The client device may perform one or more operations as described with reference to FIGS. 1 and 2A, in each training round 330. Such operations may be performed but are not required to be performed in the order presented herein. Each training round may be performed in an alternating fashion with training of the server-side submodels being performed first, followed by training of the client-side submodel (or vice versa). The client-side training round can be immediately after initialization or immediately after a previous client-side round or a previous server-side round.

Referring to FIG. 3, in each training round at the client device, the client device may receive data including one or more current server-side embeddings generated by the server-side machine learning model(s) from one or more servers 340. The data received from the server—i.e., the current server-side embedding(s)—does not include any server-side data used in generating the current server-side embedding(s).

As described with reference to FIGS. 1 and 2A, the client device may optionally generate a client-side embedding using the client-side submodel based on the client-side training data such as the training features.

As described with reference to FIGS. 1 and 2A, the client device can then update the client-side machine learning model based on the client-side embedding(s) and the current server-side embedding(s) 360. In some implementations, the client-side embedding(s) can be combined with the current server-side embedding(s) using a dot product or tensor product to generate a combined embedding. Then, the combined embedding can be used together with the client-side training labels to update the client-side machine learning model. While updating the client-side machine learning model, the parameters of the other models comprised in the decentralized model can be kept fixed.

As described with reference to FIGS. 1 and 2A, the client device can update the client-side embedding(s) using the updated client-side machine learning model 370, and the updated client-side embedding(s) can be used in subsequent rounds by the server, the client device, or both.

As described with reference to FIGS. 1 and 2A, the client device can transmit the updated client-side embedding(s) to one or more servers for updating the server-side submodel 210, 215 in subsequent rounds 380.

FIGS. 4A-4B illustrate a flow diagram of an example process 400 for training one or more server-side machine learning models of the decentralized model. For convenience, the process 400 will be described as being performed by one or more computers located in one or more locations. For example, a computer system, e.g., the server 115 of FIG. 1, appropriately programmed in accordance with this specification, can perform the process 400. Operations of the process 400 can be implemented for example by the components of the system described and depicted with reference to FIGS. 1 and 2A. For illustration, a computer system, e.g., client device 105 of FIG. 1, appropriately programmed in accordance with this specification, can perform the process 400. However, operations of the process 400 can also be implemented by any other suitable data processing apparatus, and can be configured as instructions stored on one or more computer readable media which may be non-transitory, and execution of the instructions by one or more data processing apparatus can cause the one or more data processing apparatus to perform the operations of the process 400.

As described with reference to FIGS. 1 and 2A, to train the server-side submodels, the server may obtain multiple server-side features that can be combined with server-side training labels to generate corresponding server-side training examples 410. The server-side features can be derived from raw server-side data from a server-side user.

The server may train at least part of a decentralized model in multiple training rounds 420, as described with reference to FIGS. 1 and 2A. The decentralized model is trained to output data indicating whether one or more digital components should be provided to a client device based on input user activity data and digital component attribute data. The decentralized model is a machine learning model that includes and can be separated into one or more client-side machine learning models and one or more server-side machine learning models.

The server may perform one or more operations in each training round 430. Such operations may be performed but are not required to be performed in the order presented herein. Each training round may be performed in an alternating fashion after a training round performed at a client device and followed by another training round at the same client device or a different client device. The server-side training round can be immediately after initialization or immediately after a previous client-side round or a previous server-side round.

Referring to FIG. 4B, in each training round at the server, the server may receive data including one or more current client-side embeddings generated by the client-side machine learning model(s) from one or more client devices 440. The data received from the client device do not include any client-side data used in generating the current client-side embedding(s).

The server may optionally generate one or more server-side embeddings using the server-side submodel based on the server-side training data such as the training features.

The server can then update the server-side machine learning model based on the server-side embedding(s) and the current client-side embedding(s) 460. The server-side embedding(s) can be combined with the current client-side embedding(s) using a dot product or tensor product to generate a combined embedding. Then, the combined embedding can be used together with the server-side training labels to update the server-side machine learning model. While updating the server-side machine learning model, the parameters of the other models comprised in the decentralized model can be kept fixed.

The server can update the server-side embedding(s) using the updated server-side machine learning model 470, and the updated server-side embedding(s) can be used in subsequent rounds by the server, the client device, or both.

The server can transmit the updated server-side embedding(s) to one or more client devices for updating the client-side submodel in subsequent rounds 480.

FIG. 5 illustrates a flow diagram of an example process 500 for making a personalized recommendation to a user about services or products using the trained decentralized model. The process 500 may be performed by the client device or the server. Operations of the process 500 can be implemented for example by the components of the system described and depicted with reference to FIGS. 1 and 2A. For illustration, a computer system, e.g., client device 105 of FIG. 1, appropriately programmed in accordance with this specification, can perform the process 500. However, operations of the process 500 can also be implemented by any other suitable data processing apparatus, and can be configured as instructions stored on one or more computer readable media which may be non-transitory, and execution of the instructions by one or more data processing apparatus can cause the one or more data processing apparatus to perform the operations of the process 500.

In an exemplary implementation where the process 500 is performed by the server, the server can receive a request from a client device for a recommendation 510. Such recommendation can be for a digital component to be provided for display within a content page displayed on the client device. The recommendation or output data can be based on input user activity data on the client-side and digital component attribute data of multiple digital components on the server-side, with complete separation of such information from the other side.

The server may receive, from the client device, data including the client-side embedding generated by the trained client-side machine learning model 520. Such data received from the client device does not include any client-side data, e.g., user activity data or data features used in generating the client-side embedding(s).

The server may generate a server-side embedding based on server-side data, or data features derived therefrom as input to the trained server-side submodel and using the trained server-side machine learning model 530. The server-side data is stored at the server and is not shared with or accessible by the client-side. As an example, the server-side data can be digital component attribute data relating to one or more digital components. For example, the server-side data can include attribute data of digital component(s), which can include data related to various attributes of digital component(s) that are available to be provided such as type, duration, and/or product types of the digital component(s).

The server can combine the server-side embedding(s) with the current client-side embedding(s) to obtain a combined embedding 540. Such combing embedding can be generated using a dot product or tensor product. The server-side embedding(s) can also be combined with other server-side embedding corresponding to a different server-side submodel.

The server can then generate a score corresponding to a digital component using the combined embedding 550. The score may indicate whether the corresponding digital component should be provided to the client device.

The parameters can be calculated based on the corresponding solution to a minimization problem of a predetermined objective function. Such minimization problem can be solved via variants of stochastic gradient descent (SGD) or alternating least squares (ALS). There can be various ways of solving the minimization problem. For example, the minimization problem can be solved using SGD combined with differential privacy. Further, sufficient noise can be added to the state update procedure, e.g., the gradients in SGD at one or more stages to ensure differential privacy in AM. The trained client-side submodel can be a shared machine learning model that maps user features to a user embedding among multiple client devices. Alternatively, there can be an independent client-side submodel for each client device. The server can combine multiple client-side sub-models received from multiple client devices (using a privacy-preserving aggregation method) to obtain an aggregated client-side submodel.

The server may select one digital component as a recommendation based on the calculated scores 560. For example, the server may select the digital component with the highest score or a score above a certain threshold.

The server can transmit the selected component to the client device for provision to the client 570. For example, the selected on-device advertisement may be transmitted to the client device for display within a content page displayed on the client device.

This specification uses the term "configured" in connection with computers and computer program components. For one or more computers to be configured to perform particular operations or actions means that the computer(s) has installed on it software, firmware, hardware, or a combination of them that in operation cause the computer(s) to perform the operations or actions. For one or more computer programs to be configured to perform particular operations or actions means that the one or more programs include instructions that, when executed by data processing apparatus, cause the apparatus to perform the operations or actions.

Figure 6:
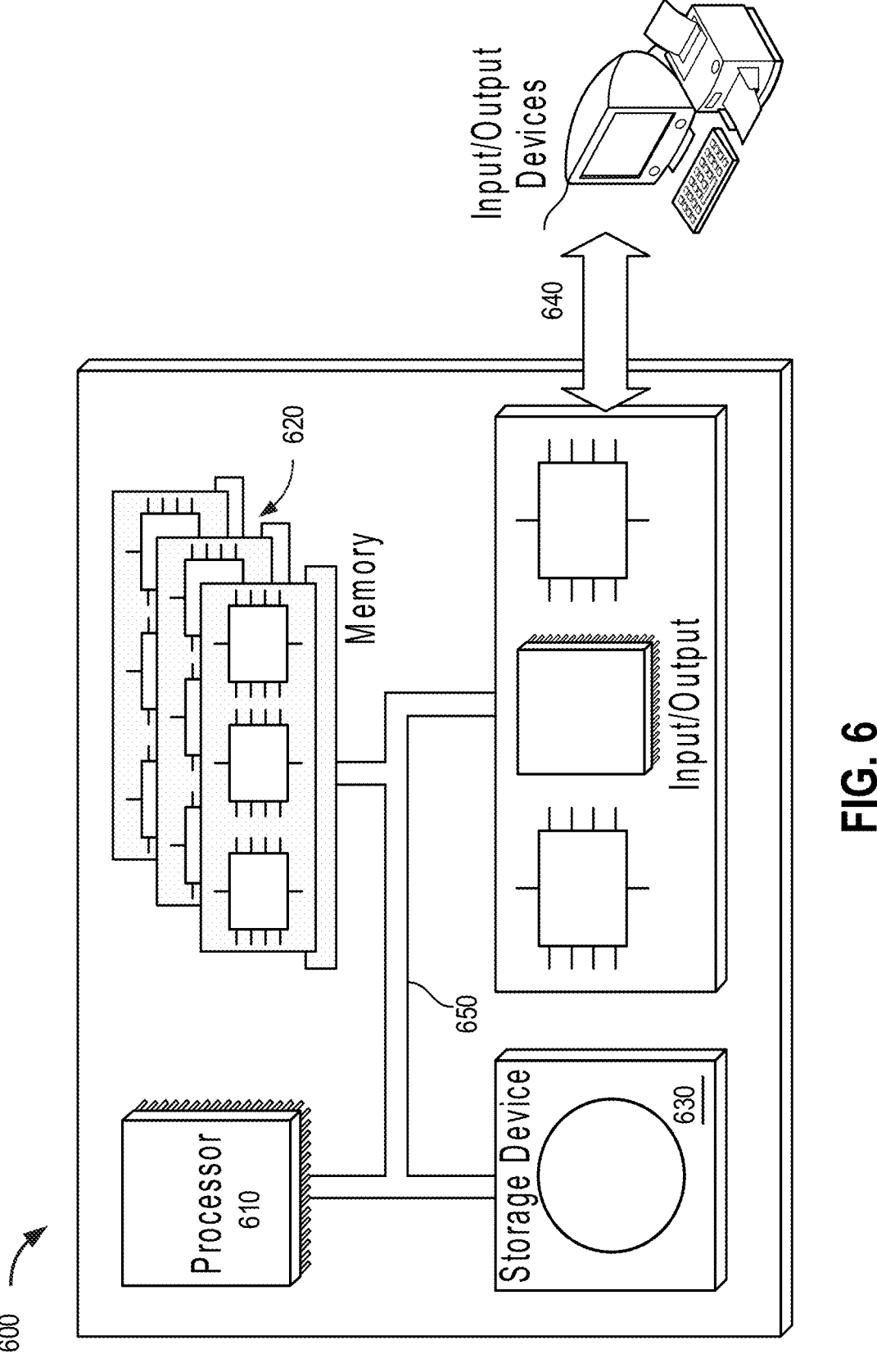
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 1-6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining, by a client device and using user activity data stored at the client device, client-side training data that includes a plurality of features and a corresponding plurality of training labels; and
training, by the client device, a decentralized model in a plurality of training rounds, wherein the decentralized model (1) is trained to output data indicating whether one or more digital components should be provided to the client device based on input user activity data and digital component attribute data, (2) includes a client-side machine learning model and a server-side machine learning model, and (3) is trained while ensuring joint differential privacy, wherein:
the server-side machine learning model comprises at least a first sub-model corresponding to a content provider and a second sub-model corresponding to a content publisher;
each of the first sub-model and the second sub-model are configured to generate a respective server-side embedding; and
training, by the client device, in each training round of the plurality of training rounds comprises:
receiving, from a server, first data including a current server-side embedding generated by the server-side machine learning model, wherein the first data received from the server does not include any server-side features used in generating the current server-side embedding;
updating, using current server-side embedding and based on the plurality of training labels, the client-side machine learning model;
generating, using the updated client-side machine learning model, an updated client-side embedding; and
transmitting, by the client device and to the server, second data including the updated client-side embedding for subsequent updating of the server-side machine learning model, wherein updating the client-side machine learning model comprises minimizing a client-side loss function based on a combination of the current server-side embedding and a client-side embedding while parameters of the server-side machine learning model are held fixed.

2. The computer-implemented method of claim 1, wherein:
the second data transmitted to the server does not include any of the plurality of features of the client-side training data used in generating the updated client-side embedding.

3. The computer-implemented method of claim 1, wherein training, by the client device, in each training round of the plurality of training rounds comprises:
combining the client-side embedding and the current server-side embedding to obtain a combined embedding, and

wherein updating, using the client-side embedding and the current server-side embedding and based on the plurality of training labels, the client-side machine learning model comprises
updating, using the combined embedding and based on the plurality of training labels, the client-side machine learning model.

4. The computer-implemented method of claim 3, wherein updating the client-side machine learning model comprises:
minimizing a loss function based on the combined embedding while keeping parameters of the server-side machine learning model unaltered.

5. The computer-implemented method of claim 4, wherein minimizing the loss function is based on stochastic gradient descent or alternating least squares.

6. The computer-implemented method of claim 1, wherein the client-side machine learning model is shared among a plurality of client devices including the client device and a second client device based on joint differential privacy.

7. The computer-implemented method of claim 1, wherein the client-side machine learning model is independent from a second client-side machine learning model for the second client device.

8. The computer-implemented method of claim 7, wherein the client-side training data and the input user activity data is not shared with or accessible by the second client device.

9. The computer implemented method of claim 7, wherein combining the client-side embedding and the current server-side embedding to obtain a combined embedding is by using a dot product or a tensor product.

10. A computer-implemented method, comprising:
obtaining, by a server and using server-side data obtained from a server-side user, server-side training data that includes a plurality of features and a corresponding plurality of training labels; and
training, by the server, at least part of a decentralized model in a plurality of training rounds, wherein the decentralized model (1) is trained to output data indicating whether one or more digital components should be provided to the client device based on input user activity data and digital component attribute data, and (2) includes a client-side machine learning model and a server-side machine learning model,
wherein:
the server-side machine learning model comprises at least a first sub-model corresponding to a content provider and a second sub-model corresponding to a content publisher;
each of the first sub-model and the second sub-model are configured to generate a respective server-side embedding; and
training, by the server, in each training round of the plurality of training rounds comprises:
receiving, from a client device, second data including a current client-side embedding generated by the client-side machine learning model, wherein the second data received from the client device does not include any client-side features used in generating the current client-side embedding;
updating, using server-side embedding and the current client-side embedding and based on the plurality of training labels, the server-side machine learning model;

generating, using the updated server-side machine learning model, an updated server-side embedding; and transmitting, by the server and to the client device, first data including the updated server-side embedding for subsequent updating of the client-side machine learning model, wherein updating the server-side machine learning model comprises minimizing a server-side loss function based on a combination of the current client-side embedding and a server-side embedding while parameters of the client-side machine learning model are held fixed.

11. The computer-implemented method of claim 10, wherein the first data transmitted to the client device does not include any of the plurality of features of the server-side training data used in generating the updated server-side embedding.

12. The computer-implemented method of claim 10, wherein the training, by the server, in each training round of the plurality of training rounds comprises:

combining the current client-side embedding and the server-side embedding to obtain a combined embedding, and wherein the updating, using the current client-side embedding and the server-side embedding and based on the plurality of training labels, the server-side machine learning model comprises:

updating, using the combined embedding and based on the plurality of training labels, the server-side machine learning model.

13. The computer-implemented method of claim 12, wherein updating the server-side machine learning model comprises:

minimizing a server loss function based on the combined embedding while keeping parameters of the client-side machine learning model unaltered.

14. The computer-implemented method of claim 13, wherein minimizing the server loss function is based on stochastic gradient descent or alternating least squares.

15. The computer-implemented method of claim 10, wherein the client-side machine learning model is shared among a plurality of client devices including the client device and a second client device based on joint differential privacy.

16. The computer-implemented method of claim 15, wherein the client-side machine learning model is independent from a second client-side machine learning model for the second client device.

17. The computer-implemented method of claim 16, wherein client-side training data and the input user activity data is not shared with or accessible by the second client device.

18. The computer-implemented method of claim 10, wherein the server-side user is a content publisher or a content provider, and wherein the server-side training data includes training digital component attribute data.

19. The computer-implemented method of claim 12, wherein combining the current client-side embedding and the server-side embedding to obtain a combined embedding is by using a dot product or a tensor product.

20. A computer-implemented method performed by a server, comprising:

receiving, from a client device, a request for a digital component to be provided for display within a content page displayed on the client device;

receiving, from the client device, first data including a client-side embedding generated by a trained client-side machine learning model, wherein;

the server-side machine learning model comprises at least a first sub-model corresponding to a content provider and a second sub-model corresponding to a content publisher;

each of the first sub-model and the second sub-model are configured to generate a respective server-side embedding; and the trained client-side machine learning model and a server-side machine learning model jointly define a decentralized model trained to output data indicating whether one or more digital components should be provided to a client device based on input user activity data and digital component attribute data;

generating, using the server-side machine learning model and based on digital component attribute data relating to a plurality of digital components, a server-side embedding, wherein the digital component attribute data is stored at the server;

combining the server-side embedding and the client-side embedding to obtain a combined embedding;

generating, using the combined embedding and for each digital component in the plurality of digital components, a score indicating whether the digital component should be provided to the client device;

selecting, from among the plurality of digital components and based on the scores for the plurality of digital components, a particular digital component; and transmitting, to the client device, the particular digital component for provision within the content page displayed on the client device.

21. The computer-implemented method of claim 20, wherein:

selecting, from among the plurality of digital components and based on the scores for the plurality of digital components, the particular digital component includes selecting the particular digital component in response to determining that the score corresponding to the particular digital component is greater than scores corresponding to other digital components in the plurality of digital components.

22. The computer-implemented method of claim 20, wherein the combining the server-side embedding and the client-side embedding to obtain the combined embedding comprises:

combining the server-side embedding and the client-side embedding using a dot product or a tensor product.

23. The computer-implemented method of claim 20, wherein the first data does not include any user activity data used in generating the client-side embedding.

24. The computer-implemented method of claim 20, wherein the server includes a plurality of servers, and wherein each server in the plurality of servers includes a respective server-side machine learning model for generating a respective server-side embedding.

25. The computer-implemented method of claim 20, wherein combining the server-side embedding and the client-side embedding to obtain the combined embedding includes:

combining the client-side embedding with a plurality of client side embeddings received from a plurality of other client devices to obtain an aggregated client-side embedding; and combining the aggregated client-side embedding and the
server-side embedding to obtain the combined embed-
ding.

* * * * *